Dec. 27, 1949     L. A. HICKSON     2,492,638
FISHING RIG
Filed March 28, 1949
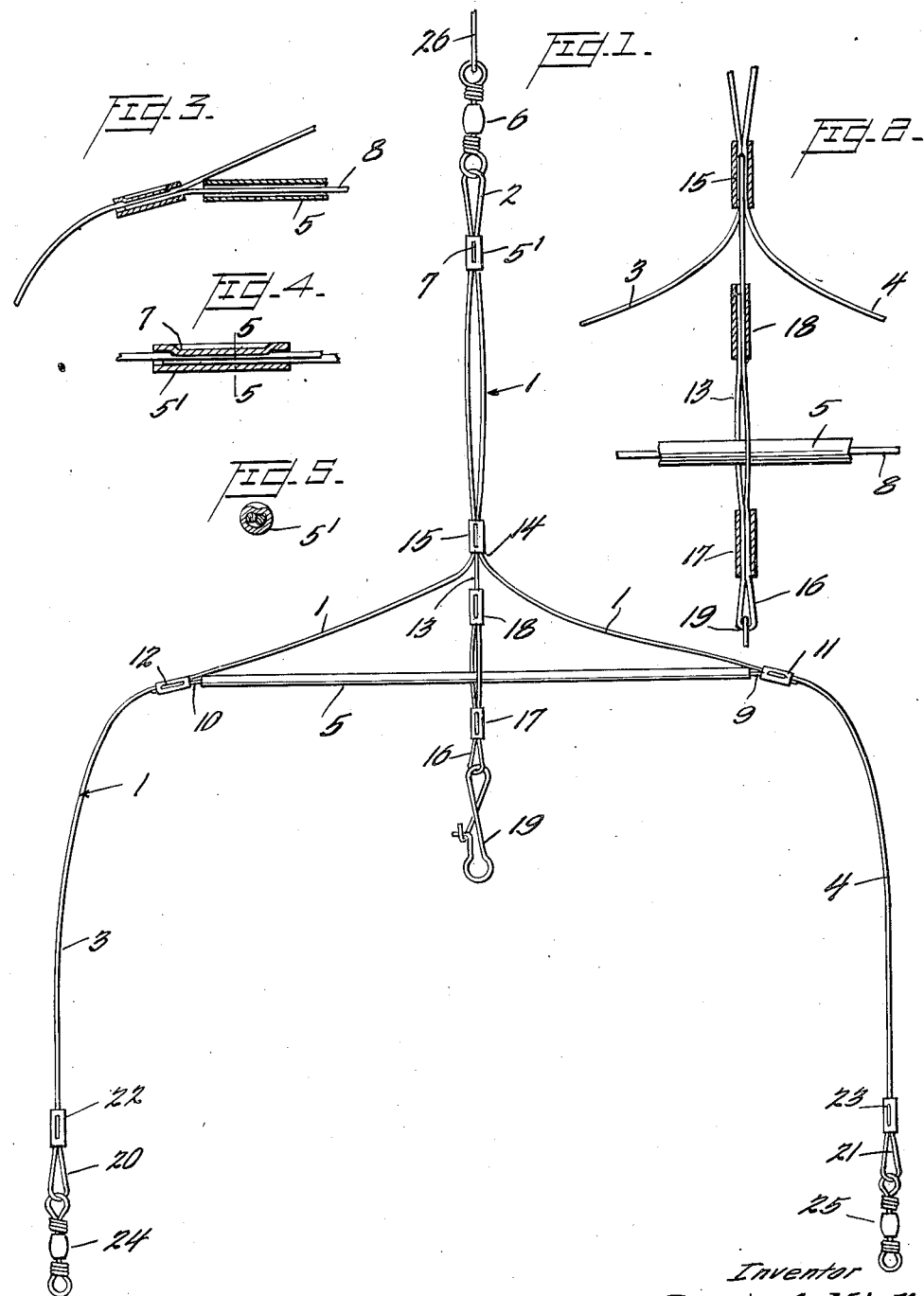
Inventor
Louis A. Hickson
By Parker Cook
ATTORNEY.

Patented Dec. 27, 1949

2,492,638

UNITED STATES PATENT OFFICE 2,492,638

FISHING RIG

Louis A. Hickson, Philadelphia, Pa.

Application March 28, 1949, Serial No. 83,948

2 Claims. (Cl. 43—28)

My invention relates to new and useful improvements in fishing rigs, and the present case is a companion to that filed by me of even date and bearing Serial No. 83,947. In the aforementioned application, a fishing rig was shown wherein two fish hooks are to be supported, one above the other, in a certain manner; while the present application relates to a rig that is known among fishermen as a "flounder rig."

A flounder rig generally consists of a rig wherein two fish hooks are supported from substantially the same horizontal plane and the two hooks held spaced laterally from the main leader.

One of the objects of the present invention is to provide a fishing rig, wherein the several parts, such as a flexible wire cable, and spreader, and swivels may readily be assembled and quickly secured in position.

Still another object of the invention is to provide a rig formed from a wire cable that is bent substantially in its center to provide two strands, and these two strands or portions of the cable are held in spaced relationship by a tubular metal spreader. All parts are held in position by small tubular collars that are first threaded on the cable and then deformed or clenched in a predetermined position.

Still another object of the invention is to provide a very flexible rig so that when the bait is taken by a fish, the likelihood is that the fish will swallow the bait before the pull is transferred to the fishing line, which is an advantage among novices, as otherwise the bait might be jerked from the fish's mouth by the fisherman before the bait is swallowed.

Still another object of the invention is to provide a strong and efficient rig which may be assembled in a minimum of time, so that the same may be made in commercial quantities at a relatively low cost.

With these and other objects in view, the invention consists in certain new and novel arrangements and combination of parts as will be hereinafter more fully described and pointed out in the claims.

Referring now to the drawings showing a preferred embodiment,

Fig. 1 is a plan view of the completed rig,

Fig. 2 is an enlarged, fragmentary view showing the manner of passing the spreader through the cable that supports the sinker, Fig. 3 is an enlarged fragmentary view showing how the spreader is held in position by a collar, Fig. 4 is an enlarged detailed sectional view of one of the collars, and Fig. 5 is a sectional view taken on line 5—5 of Fig. 4.

Referring now more particularly to the several views, and for the moment to Fig. 1, there is shown a flexible wire cable 1, which is preferably made of rustless, stainless, brass, bronze or other non-corroding metal having similar characteristics; and this cable 1 is looped back on itself about midway of its length to form the loop 2 so that there are two strands of equal length 3 and 4, which in turn are held spaced from each other by the metal tubular spreader 5, which will be referred to more in detail as the specification proceeds.

Referring to Fig. 4 for the moment, there is seen a metal collar 5', which is also a piece of tubular copper; and one of these collars 5' is threaded on the main cable 1 up to the loop 2 and then back through the same after, however, a swivel 6 has been placed on the main cable 1 and run up to the loop 2, so that when this collar 5' is deformed as at 7 the swivel 6 is permanently fastened in the loop 2.

These soft copper collars 5' are all deformed by placing them in the proper dies, one of which has a nose to force a part of the metal tubing inwardly to the strands of the cable. After the collar 5' is once deformed, it will always remain in place.

A somewhat similar collar is shown in the previous patent granted to me on January 1, 1946, and bearing Patent No. 2,392,147; but in that instance the collar contained an additional insert which I do not now find necessary in the use of these collars 5'.

Glancing now at Figs. 2 and 3, there may be be seen the tubular copper spreader 5 and this is supported on an additional piece of wire cable 8 which has its one end 9 lying adjacent the strand 4 and its other end lying adjacent the strand 3; and, here again, respective collars 11 and 12 are used, which collars 11 and 12 are identical to the collar 5'. These collars 11 and 12 are then deformed similar to the manner in which collar 5' was deformed, so that now the spreader 5 will hold the two strands 3 and 4 always in spaced relationship to each other.

To support the sinker or "dipsy," as it is called along the Atlantic Coast, I provide another short piece of wire cable 13 and lay this adjacent the meeting point of the two strands 3 and 4 as at the point 14; and, here again, the three pieces of cable are clamped in a tubular collar 15, which has been previously threaded along the cable 1.

The cable 13 then extends downwardly, is looped as at 16, is then fastened by a collar 17, and passes on the far side of the spreader 5, and its end secured to the cable 13 by another collar 18.

In the loop 16 may be placed a link 19 to which the sinker may readily be attached.

Thus we have the strands 3 and 4 spaced from each other and equally spaced from the support for the centrally disposed sinker. The lower ends of the strands 3 and 4 may then be looped back as at 20 and 21 and respectively held by collars 22 and 23; and in these loops 20 and 21 may be secured the swivels 24 and 25.

Most of the collars may be threaded on the main wire cable 1 before the assembling of the parts is started, so that in the assembling they are just moved to their proper positions and then deformed. In this way but a minimum of time is required to slip the spreader and the swivels in place and see that they are all properly tightly secured in position.

It is to be remembered that to the swivels 24 and 25 will be attached the gut leader of a hook (not shown), and these leaders in turn are generally about a foot in length, so it will be seen that when the fish takes the bait, any slack will first have to be taken up in the gut leader and then pass through the flexible strand, either 3 or 4, and then possibly tilt the spreader 5 before the pull is felt on the fishing line 26 passing through the upper swivel 6. (See Fig. 1.)

Thus there is a likelihood that the fish (and if a flounder) will have a chance to swallow the bait (often a bull-head minnow) before the fisherman feels the pull, and in that way will have a good chance to hook himself rather than have the fisherman in his excitement jerk the bait from out of the fish's mouth.

Also, by having a rigid spreader between the two strands 3 and 4 they are always held in spaced relationship so that there is a possibility of getting two fish at the one time.

As also will be seen, there is very little strain on the tubular spreader 5 as the sinker (not shown) is supported from the cable 1 and any pull from the fish will tend to tilt the spreader 5 and make a direct pull through the respective strands 3 and 4.

From the foregoing, it will be seen that I have devised a simple and inexpensive fishing rig or what is known among the fishermen as a "flounder rig" and consisting of simply a wire cable and copper tubing, a relatively long piece of which forms the spreader 5 and the relatively short pieces form collars which are previously threaded on the main strand and then deformed to hold all the parts tightly in position.

I am aware that it is old to make spreader rigs especially adapted for flounder fishing and I do not claim my invention broadly as such, but what I do claim as new and desire to secure by Letters Patent is:

1. A fishing rig including a main flexible wire cable looped centrally between its ends to form two separate strands, a rigid tubular spreader located between the same for holding the strands at a substantial distance from each other, a wire passing through said tubular spreader and connected at its ends to the respective strands to thus support the spreader, deformed collars holding the aforementioned ends of the wire to the respective strands of the main cable, and additional means secured to and depending from the main cable above the spreader and straddling the same and adapted to support a sinker just below the spreader.

2. A fishing rig including a main flexible wire cable looped centrally between its ends to form two separate strands, a deformed collar located just below the loop, a rigid tubular spreader extending between and holding the two strands of the main cable at a distance from each other, a wire extending through said tubular spreader and secured to the respective strands to thus hold the spreader in position, deformed collars securing the ends of the wire to the said respective strands of the main cable, an additional relatively short looped cable secured to the two main strands at their point of divergence just above the spreader, the spreader passing through the loop of the said last mentioned short cable, and the short cable adapted to support a sinker.

LOUIS A. HICKSON.

REFERENCES CITED

The following references are of record in the file of this patent:

UNITED STATES PATENTS

| Number | Name | Date |
| --- | --- | --- |
| 790,336 | Yoerger | May 23, 1905 |
| 1,123,636 | Weisenfeld | Jan. 5, 1915 |
| 2,201,351 | Skoverski | May 21, 1940 |